(12) United States Patent
Cho

(10) Patent No.: US 7,154,546 B1
(45) Date of Patent: Dec. 26, 2006

(54) PIXEL OPTIMIZATION FOR COLOR

(75) Inventor: Kwang-Bo Cho, Los Angeles, CA (US)

(73) Assignee: Micron Technology, Inc., Boise, ID (US)

(*) Notice: Subject to any disclaimer, the term of this patent is extended or adjusted under 35 U.S.C. 154(b) by 741 days.

(21) Appl. No.: 09/922,507

(22) Filed: Aug. 3, 2001

Related U.S. Application Data

(60) Provisional application No. 60/223,396, filed on Aug. 7, 2000.

(51) Int. Cl.
 *H04N 9/083* (2006.01)

(52) U.S. Cl. .................. 348/272; 348/273

(58) Field of Classification Search .......... 348/272, 348/273, 275, 276, 277, 300, 301, 308; 250/208.1
See application file for complete search history.

(56) References Cited

U.S. PATENT DOCUMENTS 5,119,181 A * 6/1992 Perregaux et al. .......... 348/275
5,949,483 A * 9/1999 Fossum et al. ............ 348/303
6,040,592 A * 3/2000 McDaniel et al. ......... 257/292
6,137,100 A * 10/2000 Fossum et al. ............ 348/275
6,252,218 B1 * 6/2001 Chou .................... 250/208.1

\* cited by examiner

*Primary Examiner*—Luong T. Nguyen
(74) *Attorney, Agent, or Firm*—Dickstein Shapiro LLP

(57) ABSTRACT

A macro pixel is provided. The macro pixel includes at least two color pixel elements. Each color pixel element includes a photoreceptor that in response to receiving light, generates an output signal that is indicative of the quantity of light photons of a color are received. Each of the color pixel elements are configured to receive a corresponding color. The photoreceptor of each color pixel element has a geometry and a responsivity to light that is a function of the geometry of the photoreceptor such that the responsivity of the output signal of the photoreceptor to the corresponding color is controllable by changing the geometry. The geometries of the photoreceptors are selected so that a predetermined relative sensitivity to each color is obtained.

24 Claims, 4 Drawing Sheets

PIXEL OPTIMIZATION FOR COLOR

CROSS-REFERENCE TO RELATED APPLICATIONS

This application claims the benefit of the filing date of U.S. provisional application No. 60/223,396 filed Aug. 7, 2000, the content of which is herein incorporated by reference in its entirety.

TECHNICAL FIELD

The present invention relates generally to image sensors and in particular, to complementary metal oxide semiconductor (CMOS) color image sensors.

BACKGROUND AND SUMMARY

Conventional imaging circuits typically use active pixel sensor cells to convert light energy into electrical signals. Each of the active pixel sensor cells generally includes a photoreceptor with several associated transistors that provide several pixel functions including signal formation, reset, and amplification. In a color imager, separate pixels are used for receiving each band of light, such as those corresponding to the primary colors, red, green, and blue. The responsivity of a pixel varies with the specific color of light that is being captured. For example, in a system employing red, green, and blue color pixels, having a uniform integration time for each pixel and a typical scene being imaged; the output signal of a pixel for an amount of light received will vary as a function of the responsivity of the pixel to the imaged color. Correspondingly, the signal to noise ratio (S/N) of the pixels will vary as a function of the responsivity to the imaged color. Typically, blue pixels are less responsive than red and green pixels, causing the S/N of the blue pixels to be less than the S/N of red and green pixels. In addition to differences in S/N, there are differences in saturation of the pixels. Specifically, when capturing an image with equal amounts of red, green, and blue light, the storage capacitance associated with the pixels having the greater sensitivity (the red and green pixels) will reach a maximum capacity of stored photoelectrons first, saturating the pixel.

Separate gain elements for corresponding spectral band channels can be used to equalize the output signals of the different color sensors to compensate for differences in responsivity. However, the gain elements increase the cost of the imager, require increased space, and have no effect on the differences in S/N for the different color pixels.

A macro pixel is provided. The macro pixel includes at least two color pixel elements. Each color pixel element includes a photoreceptor that in response to receiving light, generates an output signal that is indicative of the quantity of light photons received. A first of the color pixel elements is configured to receive a first color. The photoreceptor of the first of the color pixel elements has a first geometry and a responsivity to light that is a function of the first geometry of the photoreceptor such that the responsivity of the output signal of the photoreceptor to the first color is controllable by changing the first geometry. A second of the color pixel elements is configured to receive a second color. The photoreceptor of the second of the color pixel elements has a second geometry and a responsivity to light that is a function of the second geometry such that the responsivity of the output signal of the photoreceptor to the second color is controllable by changing the second geometry.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
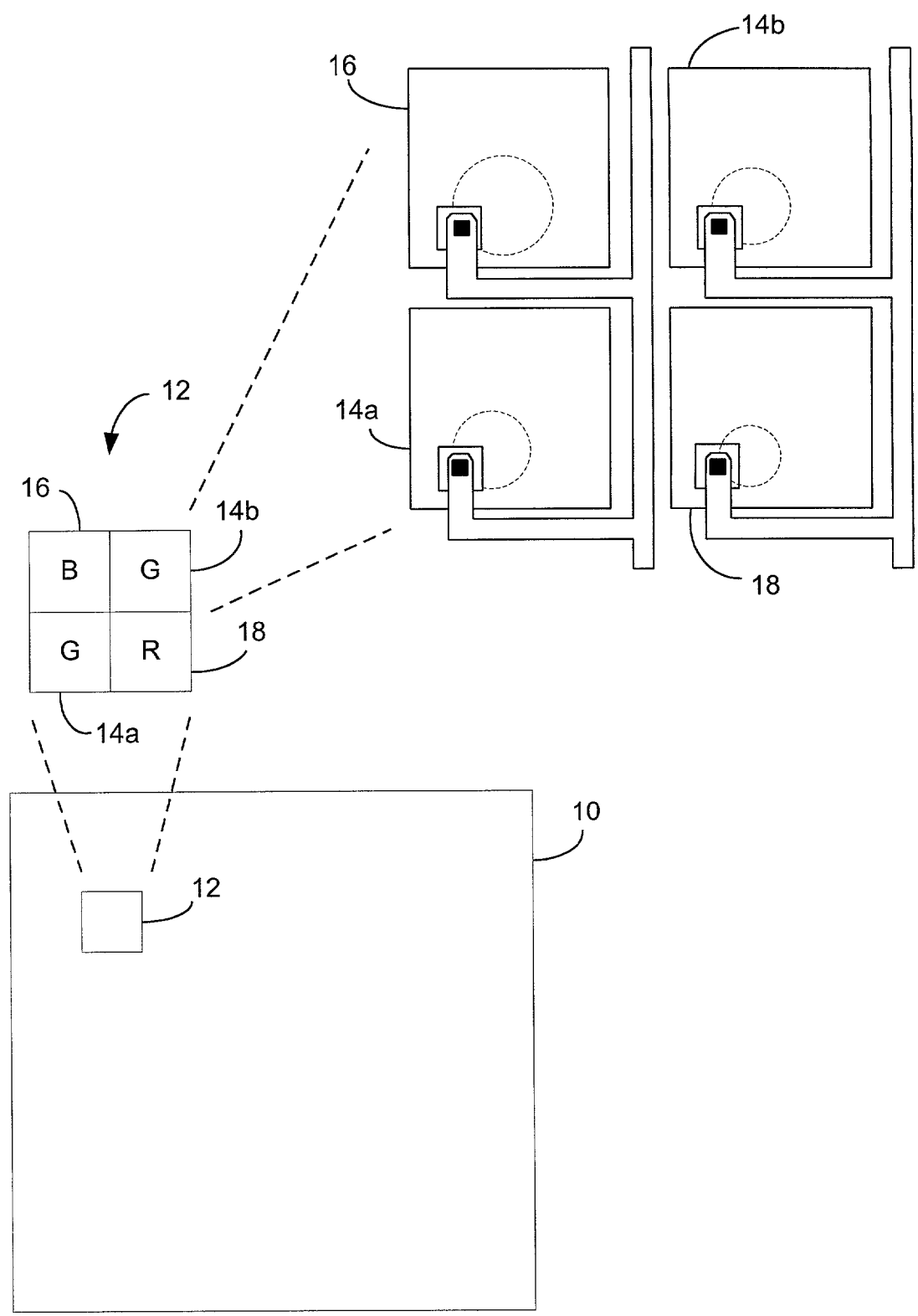
FIG. 1 is a two-dimensional view of a color pixel assembly in accordance with the principles of the invention.

An embodiment of a color imaging system 10 in accordance with the teachings of the invention is shown in FIG. 1. The color imaging system 10 includes an array of macro pixels 12, each converting received light into an electrical output signal. Each macro pixel 12 is preferably comprised of two green pixels 14$a$ and 14$b$, a red pixel 18, and a blue pixel 16 that are configured in a Bayer pattern. Although a Bayer pattern pixel configuration is preferable, other pixel configurations that include two or more different color pixels including non-primary colors may be used.

The output signal of each color pixel is described by the following equation:

$$V_n \alpha phi_n * T_n * A_n * eta_n * G_n$$

where n=1, 2, 3 . . . is the spectral band (e.g., 3 bands in the case of RGB), $phi_n$ is the flux per unit area of each pixel, $T_n$ is the transmission of each spectral band filter, $A_n$ is the collection area of each pixel, $eta_n$ is the quantum efficiency of each pixel, and $G_n$ is the conversion gain of each pixel.

The invention may compensate for differences in responsivity between different color pixels (e.g. red versus green), to control the relative sensitivity of the signal outputs, $V_n$, to $phi_n$, while maintaining relatively equal pixel area for each color pixel. To compensate for differences in responsivity, the shape of the photoreceptor, e.g. the shape of the photodiode, for each type of color pixel, is adjusted. The photodiode shapes are selected so that the relative sensitivity of $V_n$ to $phi_n$ for the signal outputs is a predetermined ratio such as 1:1:1 for a CMOS RGB color image system.

Other photoreceptors such as n+ diffusion photodiodes, standard n-well photodiodes, and n-well photodiodes with a covering insulating field oxide as described in U.S. Pat. No. 6,040,592, p+ diffusion photodiodes, p-well photodiodes, and p-well photodiodes with a covering insulating field oxide, photogates, and other devices may be used. The generation of photocurrent in both the diffusion and well type photodiodes is similar. In each, a depletion region is formed across and near the p-n junction formed by the substrate and the diffusion area/well. Incident photons pass through an open portion of the photodiode surface area and impinge on the depletion area, generating photoelectrons.

The generated photoelectrons are accumulated on the capacitance formed by the depletion area of the photodiode. The photoelectrons are swept out as a photocurrent when a reverse voltage is applied across the p-n junction.

Figure 2:
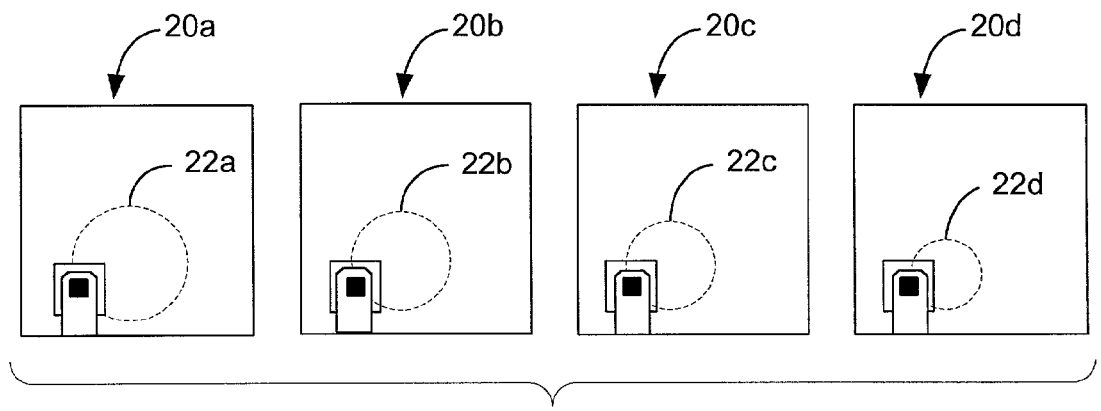
FIG. 2 is a two-dimensional view of a first series of color pixel elements.
Figure 3:
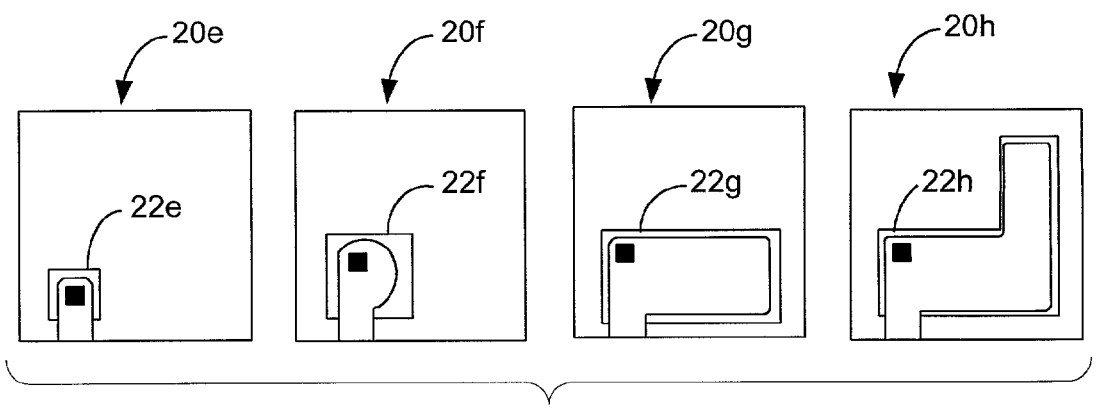
FIG. 3 is a two-dimensional view of a second series of color pixel elements.

FIGS. 2 and 3 show a two-dimensional view of a series of color pixels 20a–20h. The series of color pixels 20a–20h is used for matching the light sensitivity of different pixel configurations to the light color that a pixel measures. Although eight pixel configurations are chosen for the present example, any number of pixel configurations may be chosen. Each of the color pixels 20a–20h in the series is constructed to have a pixel area that is substantially a constant, in this case about 4.4*4.4 sq. um., with differing types of photodiodes 22a–22h that have varying shapes. The geometric shape and type of the photodiodes 22a–22h is varied to determine which color pixels 20a–20h to match with which colors to obtain output signals having a predetermined light sensitivity. In this example, color pixels 20a–20d are selected to have n-well photodiodes with variable diameter collector areas that are spaced a predetermined distance from the sidewall of the color pixel. Color pixels 20e–20h are selected to have n+ diffusion photodiodes in which the area of the collector is varied and the distance of the photodiode from the sidewall is controlled. The spectral responsivity versus wavelength and quantum efficiency versus wavelenth for each of the color pixels may be measured. In addition to varying the surface area of the collectors, other portions of the photodiode geometry that may be varied include the depth of the diffusion or well, and the spacing from the sidewall of the color pixel 20.

Figure 4:
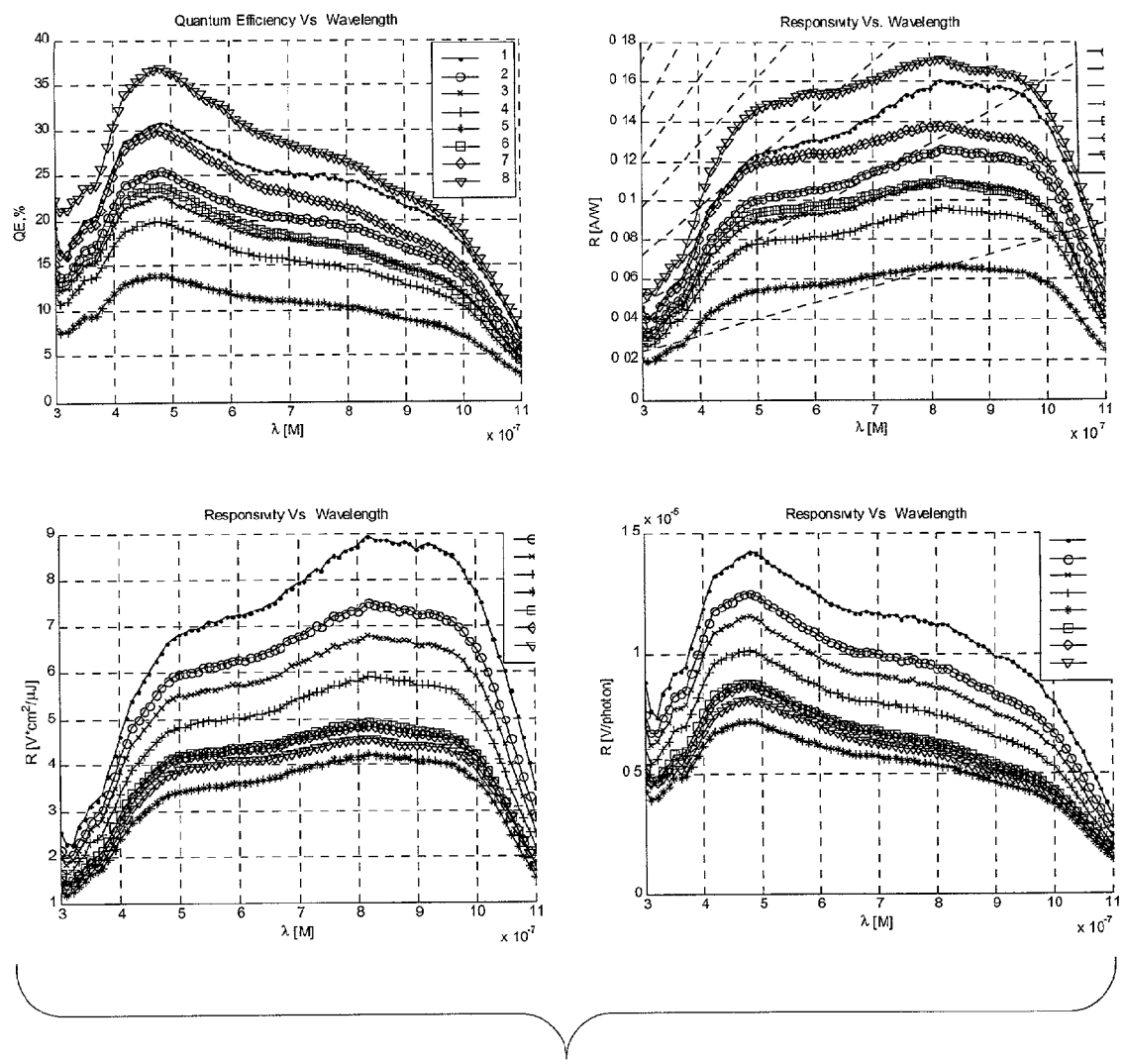
FIG. 4 is a set of graphs illustrating data associated with first and second series of color pixel elements.

FIG. 4 shows graphs of the measured spectral responsivity versus wavelength and quantum efficiency versus wavelenth of the eight color pixels 20a–20h are shown. The quantum efficiency, QE, is computed with respect to the total sensor area. As the photodiode area gets larger, the QE increases. In general, due to inherent advantages of N-well design over N+ diffusion photodiodes, N-well pixels demonstrate equal or lower capacitance and, correspondingly, equal or higher gain. Also, the capacitance is greater for pixels with larger photodiode area and longer sidewall perimeter. Also, N-well photodiodes show a higher QE and lower dark current density than the N+-diffusion photodiodes. Based on the measured data, color pixels are selected for each spectral band.

FIG. 1 shows the illustrated macro pixel configured to have a 1:1:1 relative sensitivity for a RGB CMOS imager 10. The macro pixel 12 includes color pixel 20b for the green color pixels 14a and 14b, color pixel 20a for the blue color pixel 16, and color pixel 20c for the red color pixel 18. The macro pixel 12 may alternatively include color pixel 20f for the green color pixels 14a and 14b, color pixel 20d for the blue color pixel 16, and color pixel 20h for the red color pixel 18.

Figure 5:
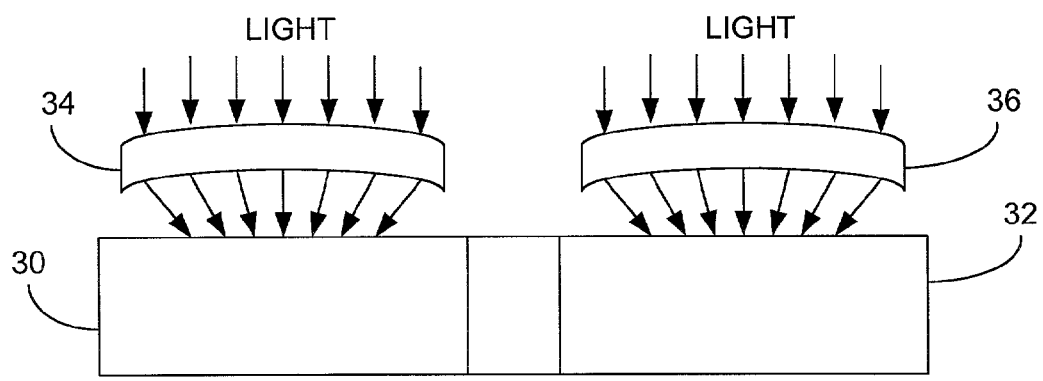
FIG. 5 is a view of a pair of color pixel elements with corresponding microlenses.

FIG. 5 shows a pair of color pixel elements 30 and 32 with corresponding microlenses 34 and 36. Using a microlens improves the fill factor of a pixel. The microlens redirects light that would have reached the edges of the pixel into a focal area such as the center of the pixel or the photodiode collector area. By redirecting the light from the edges, the quantum efficiency for a color pixel element remains constant for different photodiode shapes and sizes. To vary the responsivity of a pixel element having a microlens, the conversion gain, $G_{conv}$, may be varied. One method of varying $G_{conv}$ is to vary the photodiode collector area, since $G_{conv}$ is inversely proportional to the collector area.

Figure 6:
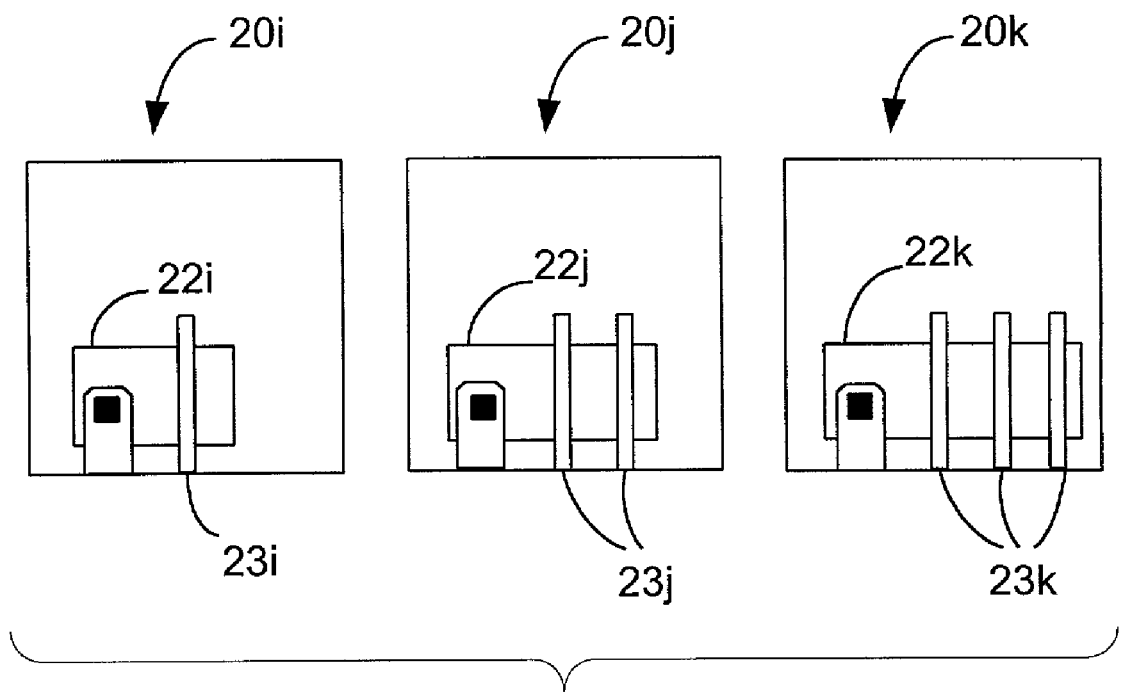
FIG. 6 is a two-dimensional view of a series of color pixel elements having active switches.

FIG. 6 shows a two-dimensional view of a series of color pixel elements with a first alternate embodiment of the present invention. The pixels 20i–20k include n+ diffusion photodiodes in which the area 22i–22k of the collector may be actively varied by controlling one or more switches 23i–23k. By activating one of the switches 23i–23k the geometry of the photodiodes changes, causing the responsivity of the corresponding pixels 20i–20k to change in a controlled manner. The switches 23i–23k may be actively controlled during normal operation or may be fusible links that are set during a configuration procedure.

A number of embodiments of the invention have been described. It is expressly intended that the foregoing description and accompanying drawings are illustrative of preferred embodiments only, not limiting, and that the true spirit and scope of the present invention will be determined by reference to the appended claims and their legal equivalent. It will be equally apparent and is contemplated that various modifications and/or changes may be made in the illustrated embodiments without departure from the spirit and scope of the invention.

What is claimed is:

1. A macro pixel, comprising:
   at least two color pixel elements of substantially equal pixel area, each color pixel element including a photoreceptor having a device geometry, responsive to receiving light, to generate an output signal indicative of an amount of light photons received, the device geometry of each photoreceptor comprising a size, a shape, a depth and a position;
   the photoreceptor of a first of the color pixel elements receiving a first color of light and having a first geometry and a responsivity to said first color of light that is a function of the first geometry;
   the photoreceptor of a second of the color pixel elements receiving a second color of light different from the first color of light and having a second geometry different from the first geometry and a responsivity to said second color of light that is a function of the second geometry; and
   the first geometry and the second geometry being such that the responsivity of the output signal of the first of the color pixel elements to the first color of light is a predetermined ratio of the responsivity of the output signal of the second of the color pixel elements to the second color of light.

2. The macro pixel of claim 1 wherein the photoreceptor of each color pixel element is selected from the group consisting of n-wells, n+ diffusion, p-wells, p+ diffusion, and photogates.

3. The macro pixel of claim 1 wherein the photoreceptor of each color pixel element is an n+ diffusion.

4. The macro pixel of claim 1 wherein the predetermined ratio is about 1:1.

5. The macro pixel of claim 1 further comprising a third one of the color pixel elements, to receive a third color of light different than the first color of light and the second color of light, the photoreceptor of the third one of the color pixel elements having a third geometry and a responsivity to light that is a function of the third geometry of the photoreceptor.

6. The macro pixel of claim 5 wherein the first geometry, the second geometry, and the third geometry are selected such that the responsivity of the output signal of the first of the color pixel elements to the first color of light, and the responsivity of the output signal of the second of the color pixel elements to the second color of light, and the responsivity of the output signal of the third one of the color pixel elements to the third color of light is a predetermined ratio.

7. The macro pixel of claim 6 wherein the predetermined ratio is about 1:1:1.

8. The macro pixel of claim 1 further comprising a microlens photonically coupled to at least one of the color pixel elements.

9. The macro pixel of claim 6 further comprising corresponding microlenses photonically coupled to each of the color pixel elements.

10. The macro pixel of claim 1 wherein at least one of the color pixel elements further comprises at least one switch coupled to the photoreceptor to vary the device geometry.

11. The macro pixel of claim 10 wherein the at least one switch actively varies the device geometry.

12. Wherein the macro pixel of claim 1 is included in a color pixel assembly, the color pixel assembly including a plurality of macro pixels.

13. A CMOS color pixel assembly, comprising:
a plurality of macro pixels, each macro pixel of the plurality of macro pixels comprising:
at least three color pixel elements of substantially equal pixel area, each color pixel element including a photoreceptor having a device geometry, responsive to receiving light, to generate an output signal indicative of an amount of light photons received, the device geometry of each photoreceptor comprising a size, a shape, a depth and a position;
a first one of the color pixel elements, configured and arranged to receive a first color of light, the photoreceptor of the first one of the color pixel elements having a first geometry and a responsivity to light that is a function of the first geometry of the photoreceptor;
a second one of the color pixel elements configured and arranged to receive a second color of light different than the first color of light, the photoreceptor of the second one of the color pixel elements having a second geometry different from the first geometry and a responsivity to light that is a function of the second geometry; and
a third one of the color pixel elements, configured and arranged to receive a third color of light different than the first color of light and the second color of light, the photoreceptor of the third one of the color pixel elements having a third geometry and a responsivity to light that is a function of the third geometry of the photoreceptor.

14. The color pixel assembly of claim 13 wherein the first geometry, the second geometry, and the third geometry are selected such that the responsivity of the output signal of the first one of the color pixel elements to the first color of light, and the responsivity of the output signal of the second one of the color pixel elements to the second color of light, and the responsivity of the output signal of the third one of the color pixel elements to the third color of light is a predetermined ratio.

15. The color pixel assembly of claim 14 wherein the predetermined ratio is about 1:1:1.

16. The color pixel assembly of claim 13 wherein the photoreceptor of each color pixel element is selected from the group consisting of n-wells, n+ diffusion, p-wells, p+ diffusion, and photogates.

17. The color pixel assembly of claim 13 further comprising a microlens photonically coupled to at least one of the color pixel elements.

18. The color pixel assembly of claim 13 further comprising corresponding microlenses photonically coupled to each of the color pixel elements.

19. The color pixel assembly of claim 13 wherein at of least one of the color pixel elements further comprises at least one switch coupled to the photoreceptor to vary the device geometry.

20. The color pixel assembly of claim 19 wherein the at least one switch actively varies the device geometry.

21. A color pixel assembly including at least one macro pixel, the macro pixel comprising:
at least three color pixel elements having equal pixel areas, each color pixel element including a photoreceptor having a device geometry and at least one switch configured and arranged to selectively change the device geometry, responsive to receiving light, to generate an output signal indicative of an amount of light photons received, the device geometry of each photoreceptor comprising a size, a shape, a depth and a position;
a first of the color pixel elements, configured and arranged to receive a first color of light, the photoreceptor of the first of the color pixel elements having a first geometry and a responsivity to light that is a function of the first geometry of the photoreceptor, the responsivity of the output signal of the photoreceptor to the first color being controllable by changing the first geometry;
a second of the color pixel elements configured and arranged to receive a second color of light different than the first color of light, the photoreceptor of the second of the color pixel elements having a second geometry and a responsivity to light that is a function of the second geometry, the responsivity of the output signal of the photoreceptor to the second color being controllable by changing the second geometry; and
a third one of the color pixel elements, configured and arranged to receive a third color of light different than the first color of light and the second color of light, the photoreceptor of the third one of the color pixel elements having a third geometry and a responsivity to light that is a function of the third geometry of the photoreceptor, the responsivity of the output signal of the photoreceptor to the third color is being controllable by changing the third geometry.

22. The color pixel assembly of claim 21 wherein the first geometry, the second geometry, and the third geometry are controlled such that the responsivity of the output signal of the first of the color pixel elements to the first color of light, and the responsivity of the output signal of the second of the color pixel elements to the second color of light, and the responsivity of the output signal of the third one of the color pixel elements to third color of light is a predetermined ratio.

23. The color pixel assembly of claim 22 wherein the predetermined ratio is about 1:1:1.

24. The color pixel assembly of claim 21 wherein the photoreceptor of each color pixel element is selected from the group consisting of n-wells, n+ diffusion, p-wells, p+ diffusion, and photogates.

* * * * *